United States Patent Office 3,248,947
Patented May 3, 1966

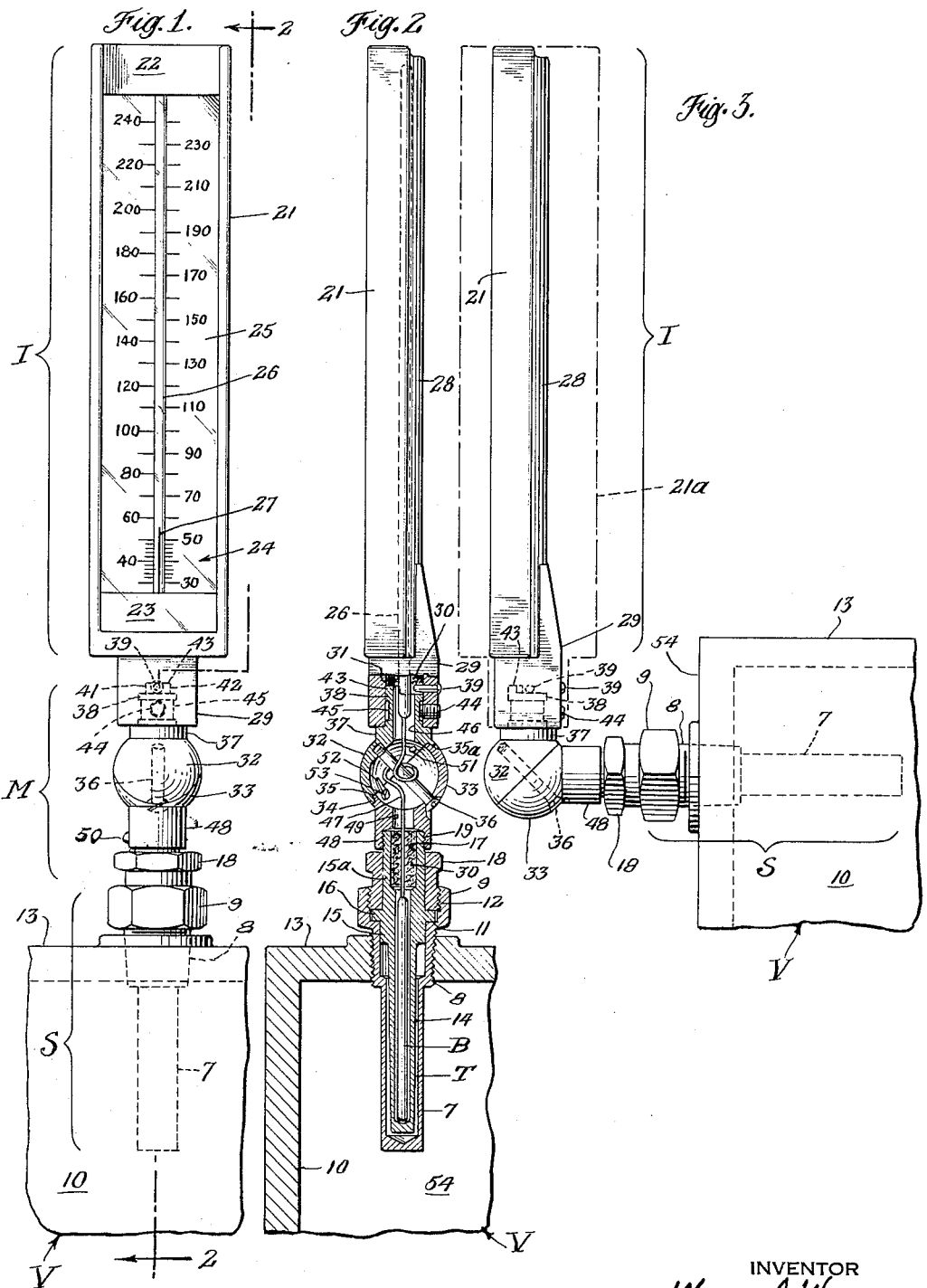

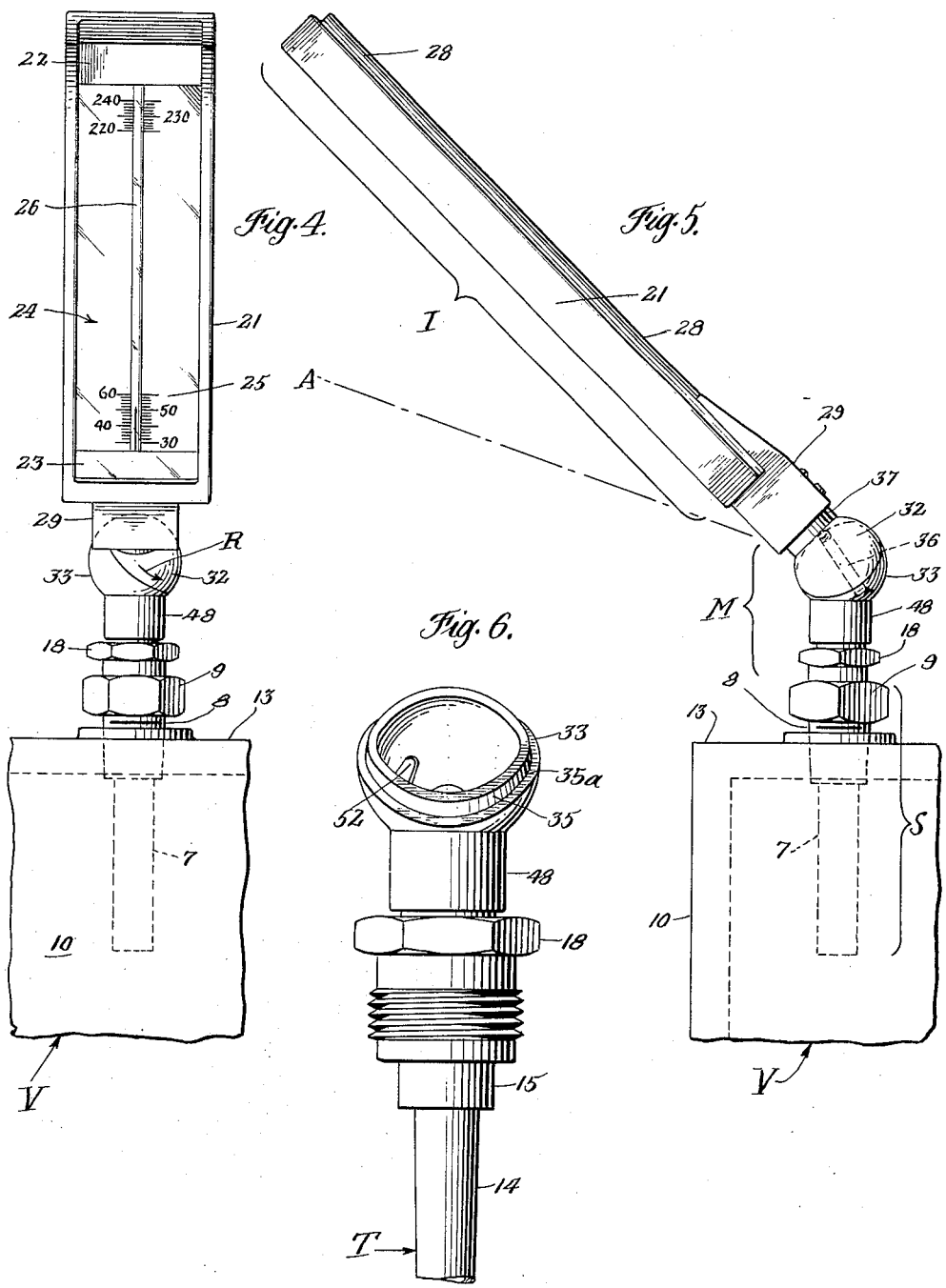

3,248,947
INSTRUMENTS WITH VARIABLY-POSITIONABLE
INDICATORS
Warren A. Weinmann, Rock Hall, Md., assignor to Precision Thermometer & Instrument Co., Philadelphia, Pa., a corporation of Pennsylvania
Continuation of application Ser. No. 839,884, Sept. 14, 1959. This application Mar. 27, 1963, Ser. No. 269,836
5 Claims. (Cl. 73—375)

This is a continuation of application Serial No. 839,884, filed September 14, 1959, and now abandoned. The invention relates to instruments with variably-positionable indicators, and particularly to instruments of a scale type, for example thermometers, where the indicating device which is to be adjusted in its position comprises a fluid-containing tube associated with a graduated scale which carries an index, such as a series of numerals representing, for example, degrees F. of temperature.

The principal object of the invention is to provide a wide range of adjustable setting of the indicating portion of the instrument with reference to the supporting portion of the instrument, while assuring the maintenance of any given adjustment throughout such range.

Other objects of the invention include the accomplishment of the principal object in such a way that the supporting portion of the instrument may be located in any of a variety of positions and, for any given position thereof, the indicating portion may then be adjusted to any desired variety of other positions; and, in the preferred embodiment, the supporting portion of the instrument may be disposed at any angle whatever, depending upon the wishes or requirements of the user, and the indicating portion may be substantially universally adjusted with respect thereto. By way of an example, with reference to a thermometer embodying the invention, where the instrument may include a supporting device enclosing a sensing device (such as a thermometer bulb) and an indicating device comprising a thermometer tube associated with an elongated, indexed scale, for example of a more or less flat panel type, the supporting device, which preferably has a long axis and houses coaxially an elongated bulb, may be extended into a vessel or the like through the top wall thereof and be secured thereto; or alternatively, it may be extended into a vessel through a side, end, or bottom wall; and, depending upon the circumstances or requirements, the axis of the mounting device may be adjusted to be upright, horizontal, or at an angle acute or obtuse to one or another of these directions. Whatever the given setting of the supporting device, the indicating device may be adjusted, throughout an infinity of angular settings within the angular range of adjustment and may if desired be fixedly set at any chosen adjustment, so as not to be shaken loose either by the weight of the extending instrument or by vibration or other causes.

More specifically, the invention contemplates the accomplishment of all of the foregoing in such a way that regardless of the chosen angle between the longitudinal axis of the supporting device and the longitudinal axis of the indicating device, the indicating device may itself be turned through a substantial angle about its own longitudinal axis, preferably with an infinity of angular settings, within the angular range of approximately 180° or more, about the said longitudinal axis of the indicating device. Thus, with a panel type indicating scale, this may be arranged to be examined or read from any desired point of view, for example, from the front, the back or the side of the vessel on which the instrument is mounted, or from a position wherein the viewer is looking at an oblique angle with reference to the front, the back or the side of the vessel.

Still more specifically, in the accomplishment of the foregoing the invention contemplates the variable carrying of the indicating device on the supporting device by mechanical mounting means comprising at least two rotative connections, one of which is adjustable about one axis and the second of which is adjustable about an axis disposed about an oblique angle to the first axis; and in the preferred embodiment, such mechanical mounting means includes the disposition of the obliquely angled axis at approximately 45° to the other axis of rotative connection, and preferably also substantially intersecting the same; these specific arrangements providing for a maximum of adjustability at a minimum of mechanical complexity.

Still further, in order to realize the objects and advantages of the invention to the full, the mechanical mounting means between the indicating device and the supporting device comprises three rotative connections, each adjustable about an axis, the axis of rotational adjustment of one of them being oblique to each of the other two, and this oblique axis desirably being interposed between the other two, the latter two being substantially parallel to each other in one position of adjustment of the obliquely angled connection and also being preferably parallel respectively to the longitudinal axes of the mounting device and the indicating device. I use the term "parallel" as being inclusive of "coaxial."

For an instrument having such tri-axial adjustment, the invention contemplates a range of angular adjustment of the oblique connection of approximately if not quite 360°, and a range of angular adjustment of each of the other two connections of approximately and preferably more than 180°.

In its preferred embodiment, the invention contemplates a number of features of constructional and operational advantage, including, among other things, the making of the mechanical rotative connections hollow so as to house other parts of the instrument such as a flexible signal transmitting means operatively interconnecting the sensing device and the indicating device, and stop or limiting means which are constructed and arranged to limit the rotative adjustment to prevent the same exceeding the tolerable limits of distortion of such flexible transmitting means. Further, in the preferred embodiment, having the above-mentioned assembly of three rotational adjusting devices, one is a means of adjustment between the supporting device and the oblique adjusting device, and the flexible signal transmitting means carries with it the sensing device (such as the bulb of a thermometer) so that the latter rotates within the housing formed by the supporting device.

Also in the preferred embodiment, the adjustable connection having its axis oblique to the other adjusting axis or axes, is provided by a joint comprising two hemispherical parts, each with an axial extension, said parts having annular mating seats oriented in a plane oblique to said extensions, the seats being so constructed as to bewedged together when assembled, as by means of a screw engaging both of said parts; and the extensions having a bore through which a flexible thermometer tube may pass, the hemispherical parts also housing cooperative abutments which prevent excessive relative rotation of said parts so as to prevent damaging the flexible thermometer tube.

How the foregoing objects and advantages are obtained, and how the features of construction above mentioned are configured and related to each other, and how other advantages and uses of the invention may be obtained by the same or by equivalent means, will appear more clearly from the following description, taken together with the accompanying drawings.

FIGURE 1 of the drawings is a vertical front elevational view of a thermometer embodying the invention in its present preferred form, the same being mounted vertically and shown as extended through and fastened to the top wall of a tank or other vessel, a portion of which is illustrated in this figure—certain parts of the instrument being shown in dotted lines.

FIGURE 2 is a vertical view of the instrument and portion of the vessel shown in FIGURE 1, partly in elevation and partly in section, taken on the line 2—2 of FIGURE 1.

FIGURE 3 is an elevational view of the same instrument mounted on the side wall of the vessel, with the supporting device of the instrument disposed horizontally and the indicating device of the instrument disposed vertically, this view showing the indicating device in full lines as facing toward the left of the figure, and in chain dotted lines as facing either into or out of the plane of the paper.

FIGURE 4 is an elevational view generally similar to FIGURE 1, but showing the adjustable parts of the instrument in such relative positions that the indexed panel of the indicating device is inclined downwardly at the top, toward the viewer.

FIGURE 5 is a right side elevational view of the structure of FIGURE 4.

FIGURE 6 is a fragmentary elevational view, taken in the same direction as FIGURE 1 but to a larger scale, showing the lower half of the hollow joint having the oblique axis, the rotative mounting thereof on a vertical axis with respect to the fastening nut which is adapted to threadedly cooperate with the inside of the upper end of the supporting device, and showing also the upper portion with the bulb, itself, is adapted to be mounted within the supporting device (not shown in this figure).

For purposes of illustration of the invention, I have chosen an industrial type of thermometer which, as shown generally in FIGURE 1, comprises an indicating device I, a supporting device S, and intermediate mechanical mounting means M. As here shown, the instrument as a whole is associated with a vessel V.

The supporting device, in this embodiment, comprises a brass socket having three integral portions, i.e. an elongated tubular member 7, closed at the bottom, an externally threaded portion 8 of larger diameter than said tubular portion, and an external hex head 9, which internally is of larger diameter than the portion 8 and is formed with an annular seat or shoulder 11 and a threaded inside wall 12.

The threaded shank 8 may be screwed into the top wall 13 of the vessel V, for supporting the whole instrument and for housing the sensing device which extends into the vessel V, in this case for determining the temperature within the vessel.

The sensing device in this instance comprises the thermometer bulb B, and may also be deemed to include the steel housing tube T, which is closed at its lower end and comprises an elongated shank 14 (fitting, with clearance, inside the tubular member 7 of the supporting device). The shank 14 at its upper end is thickened at 15 to have a sliding fit with the inside of the portion 8 of the supporting device. Next above the portion 15, the steel tube T has an integral annular ring or peripheral flange 16, having clearance or an easy turning fit with respect to the internal thread 12 of the nut 9.

Above the flange 16, the member T has a continuation 15a, preferably of the same external diameter as the portion 15, and preferably internally enlarged to form a cup 17 to receive a packing 30 (later described). The portion 15a is for the most part surrounded by, and has an easy rotating fit with, the brass clamping nut 18, whose lower part is externally threaded to engage the internal thread 12 of the nut 9. When nut 18 is turned down tight in nut 9, it clamps the flange 16 of the member T as against rotation. This portion of the assembly provides one axis of adjustment for the instrument, this axis being in the present embodiment coaxial with the long axis of the supporting device S and the long axis of the sensing bulb B. In this embodiment, when the nut 18 is loosened, the member T with the bulb B therein, and all parts of the instrument above the nut 18, may be rotated, for adjustment, throughout an angle of 360°. The member T at the top extends above the nut 18 and may be externally threaded at 19 for fastening it fixedly and securely to the structure thereabove, which will be later described.

Considering next the indicating device I, this may conveniently comprise an aluminum alloy casting or other metal frame or shell 21 which, with suitable securing plates 22, 23, carries or retains a glass panel 24, a scale member 25 (behind the glass) and an intermediate thermometer tube 26, in which the liquid 27 may rise and fall, in the usual way, as determined by the temperature of the bulb B. In this case, the scale face or member 25 may be marked with graduations and numerals indicating degrees of temperature, Fahrenheit, from 30 to 240. The back wall 28 of the indicator frame or body 21 may be bulged outwardly as shown, or constructed in any other suitable manner, and at the bottom, the structure 21, 28 may merge with an integral extension 29, of generally rectangular external cross-section. This extension is axially bored at 31 to receive an adjacent portion of the mechanical mounting structure now to be described; and at this junction there is thus formed a rotative connection having an axis coinciding with the longitudinal axis of the indicating device, which in this embodiment is also coaxial with the axis of the support device S, when the parts of the assembly are in the relative positions shown in FIGURES 1 and 2.

Upper and lower brass hemispherical parts 32 and 33, are provided with mating seats adapted to be locked together. While these may take the form of serrated edges (or other forms) I have found it satisfactory for most purposes to supply the members 32 and 33, respectively, with internal and external tapered, curved or conical mating seats 34 and 35 (the latter being better shown in the enlarged detail view of FIGURE 6). These seats are annular, and located in an inclined plane, relative to the longitudinal axis of the assembly, so that the axis of adjustment by rotation of member 32 on member 33 is oblique, being the same as the axis of the securing or locking screw 36, which extends at 45° to the vertical axis of the assembly as shown in FIGURES 1 and 2. The screw 36 passes through an aperture in member 33, and the head of the screw seats tightly in a tapered seat as shown. The end of the screw is threaded into an internally threaded socket, as shown, in the member 32. The shoulder 35a of part 33 and the corresponding shoulder (not numbered) of member 32 are slightly spaced from the opposing tapered seating rings 34 and 35 of the respective mating members, so that when the screw 36 is pulled up tight, the tapered surfaces 34 and 35 will bind or lock the assembly in whatever position of relative rotation the parts 32 and 33 have been placed. Thus, this oblique joint may be held tightly as against maladjustment or dislodgement by vibration of the vessel or of an engine or machine on which the instrument may be mounted. Other features of this hollow ball-like assembly will be referred to later on.

In the instrument as shown in FIGURES 1 and 2, the upper hemispherical member 32 has an axial cylindrical extension 37. This is "axial" in the sense that it extends approximately parallel to the general axis of the indicating device I, or to the general axis of the instrument when its parts occupy the relative positions of adjustment seen in FIGURES 1 and 2. Member 37 has a reduced shank 38 rotatively fitting within the bore 31 of member 29. Relative adjustment about the axis of these parts is limited by a fixed pin 39 adapted to engage alternatively the shoulders 41 and 42 formed by the upper extremity 43 of shank 38.

Retention of shank 38 within the bore 31, and fixity of relative rotative adjustment between members 38 and 29, is provided by the set screw 44 which rides in an annular groove 45 formed on the outer periphery of shank 38 of the member 37. Member 37 and its reduced shank 38 are longitudinally bored, as shown at 46, to freely pass the lower portion of the thermometer tube 26 and the flexible capillary tube 47 of the thermometer.

Protective and insulative packing, such as asbestos 30, may be placed in the bore 31 around the thermometer tube and may be placed in the bore 17 of the shank 15a, around the capillary tube, and in the oblique joint if found desirable.

The lower hemispherical joint part 33 has an axial extension 48, extending downwardly and internally threaded or otherwise formed to be tightly and permanently engaged with the shank 15a. A screw or pin, as shown at 50, may be applied to lock these parts together. This axial extension has an internal bore 49, to pass the capillary tube 47, similar to the internal bore 46 of the upper extension member 37.

Capillary tube 47 is desirably of thin-walled flexible metallic tubing, and where it passes through the internal hollow of the spherical joint parts 32, 33, it is formed with a loop or coil of one or more turns, lying alongside of, or (as here shown) encircling the securing screw 36 for the mechanical joint. This flexible loop or coil permits substantially 360° of rotation of the part 32 relative to the part 33 and more than 180° of relative rotation between the shank 38 and the bore 31.

In order to avoid damage to or breakage of the fine thermometer tube 47 (or of any other signal-transmitting means which may be housed within the joint parts 32, 33) I have provided not only the limiting pin 39 and shoulders 41, 42, at the upper axial joint, but also two cooperating limiting abutments mounted respectively within the members 32 and 33. One of these is a small pin 51 fixed to the inside of member 32 and the other is a finger 52 fixed at 53 to the member 33 (see also FIG. 6) so that at either extreme of the relative rotation of the parts 32, 33, the finger 52 will strike the stop pin 51. This permits almost 360° of adjustment of the obliquely angled joint. This range of adjustment plus the range about the axis of the indicating device I will together not exceed the tolerable limits of distortion of the flexible signal transmitting member 47. The angular adjustment of the downward extension 48 of the ball member 33 about the axis of the supporting devices S does not, in this construction, introduce any problem with respect to the capillary tube 47, since the steel housing T with the enclosed thermometer bulb B will turn with the extension 48, when the nut 18 is loosened to make the adjustment at that point.

In the arrangement of FIGURES 1 and 2, the scale of the thermometer is standing upright and the front of it is facing so as to be read by a person who is in a position facing the front wall 10 of the vessel. However, it will be understood that the upright indicating portion of the thermometer can be turned through any angle up to more than 90° either way from this position, by loosening the set screw 44 and turning the assembly from 29 upward; or the thermometer can be turned still further, to be read horizontally from any direction (throughout 360°), by loosening the nut 18 and turning the entire assembly from there upward, through any portion of 360°.

By reference to FIGURE 3, it will be seen that the supporting device S has been projected horizontally into the side wall 54 of the vessel V, whereas the indicating device I remains in a vertical position. This has been accomplished by relative rotation of the parts of the obliquely angled joint through 90°, and then turning the whole instrument from the position where it faces forward in FIGURE 1 to a position where it faces to the left in FIGURE 3. With that adjustment, the instrument is in a position to be mounted horizontally in the side wall 54 of the vessel V and to be viewed by persons standing at the side of the vessel. If it is desired that the supporting device of the instrument be mounted horizontally in the side wall 54 (as in FIG. 3) but that the indicating device I be readable from the front of the vessel, the device I may be turned 90° counter-clockwise (looking down from the top) to the chain-dotted line position of the frame 21, as indicated at 21a. If it be desired that the indicating device be read from a position to the rear of the vessel V, the said device may be turned (clockwise looking down) from the full-line position of the frame 21 to the chain-dotted line position shown at 21a. It will be understood that the chain-dotted outline 21a is representative of either a forward facing or a backward facing position of the indicating panel 25—in that figure.

The rotative adjustment of the indicating device I about its longitudinal axis is of course made by loosening the set screw 44, turning the device I, and again tightening the set screw. The angular adjustment between parts 31 and 33 of the oblique-axis joint is of course made by loosening the screw 36, relatively turning the parts 32 and 33, and again tightening the screw 36.

Certain oblique settings of the device I relative to the device S may be obtained by the two joints whose adjustment has just been described. However, in order to obtain a universal adjustment of indicating device I relative to supporting device S, so as to provide an infinity of relative angles between their longitudinal axes and also an infinity of angles at which the thermometer may be read, the rotational adjustment of the extension 48 of member 33 about an axis paralleling the long axis of the supporting device S is resorted to. This will be apparent from inspection of FIGURES 4 and 5, which, in full lines, illustrate but one of the oblique angles between devices I and S, and also only one of the possible reading directions in which the thermometer face may be turned for the particular oblique angular setting of I and S.

In FIGURE 4, the thermometer is viewed from the front of the vessel V, as in FIGURE 1, but it is assumed that the top wall 13 of the vessel is positioned at a higher level, and that a person standing in front of the same must look upwards at an oblique angle in order to read the thermometer. In this case, so that the thermometer may be easily and accurately read (and without distortion due to viewing the thermometer fluid at an angle to the graduations) the indicating device I is tilted toward the viewer, at its upper end—that is, it is tilted forward with reference to the front wall 10 of the vessel V. To accomplish this, it is necessary to rotate the ball part 32 upon the ball part 33 to secure the desired angle of tilt between the long axis of the indicating device I and the long axis of the supporting device S, and it is also necessary to turn the part I of the instrument about its own axis, relative to the hemispherical part 32, and to turn the vertical joint below the oblique joint, about the axis of supporting device S. Thus, in FIGURE 4 (as compared with FIGURE 1) the rotation of the lowermost joint has been counterclockwise viewed from above, the rotation of member 32 of the oblique joint has been in the direction of the arrow R, and the rotation of the upper axial joint has been clockwise, viewed from above.

The side elevational view of FIGURE 5 shows the thermometer facing at an oblique angle directly toward a viewer assumed to be standing in front of the wall 10 of the vessel. While this particular oblique angle is shown as 45°, it will be readily seen that a completely universal adjustment of this instrument is possible, so that it may be mounted in any position on any piece of equipment desired, and may then be read from any desired angle; another typical angular setting of the portion I being shown by the broken line A in FIGURE 5.

The versatility of the instrument is thus exceptional, and the construction by which the adjustability and the fixing of any particular adjustment are secured is really quite simple. These capabilities make the instrument very flexible in its use and very adaptable to a variety of uses, particularly industrial uses, where for example a thermometer may be mounted on the top of a boiler, or on the side thereof, or on the front or back of it, or at various locations and angles upon tanks, pipes, pressure vessels, etc.; there being in many such installations only a single location where personnel who read the instrument may stand for taking readings.

I claim:

1. An instrument comprising a supporting device adapted to be fixed in a position, a sensing unit and an indicating unit with adjustable mounting mechanism operatively interposed between them, said two units and mounting mechanism constituting an assembly rotatably associated as an entirety with said supporting device for turning about a fixed axis of said device, means for holding said assembly in any of its positions of rotation about said fixed axis, said mounting mechanism incorporating a normally fixed coupling which is releasable for adjustable turning of said indicating unit about a second axis together with a limiting device adapted to restrict such turning about said second axis to less than 360°, the mounting mechanism further incorporating a normally fixed but releasably rotative joint providing a third axis of turning adjustment which is oblique to the first and second axes and having a limiting device adapted to restrict such turning to less than 360°, and a flexible operating connection between elements of the sensing and indicating units, said supporting device having an internal shouldered socket, said mounting mechanism incorporating a nut cooperating therewith to provide an annular recess, and the rotatable assembly having a peripheral flange seated in said recess and adapted to be clamped therein, whereby said rotatable assembly and said supporting device are held against relative axial movement regardless of the rotative adjustments of the rotatable assembly.

2. A construction according to claim 1, wherein the sensing unit includes a central sensing member and a surrounding protective tube which is adapted to turn with said member, but relative to said supporting device, during adjustment about the first mentioned axis.

3. A construction according to claim 2, wherein the support device includes a shell surrounding said tube.

4. A construction according to claim 1, wherein said rotative joint which provides the third axis of turning adjustment is so configured that said third axis is at an angle of 45° to each of the first and second axes.

5. A construction according to claim 1, wherein said rotative joint which provides the third axis of turning adjustment is an enclosed hollow ball joint, and the said flexible operating connection comprises a loop which is centrally housed within said ball joint.

References Cited by the Examiner

UNITED STATES PATENTS

| 941,863 | 1/1909 | Erickson | 285—185 |
| 2,271,193 | 1/1942 | Hohmann | 73—375 |
| 2,524,894 | 10/1950 | Dobrin | 73—375 |
| 3,079,798 | 3/1963 | Weiss et al. | 73—368 |

FOREIGN PATENTS

| 732,146 | 11/1953 | Great Britain. |
| 774,324 | 3/1955 | Great Britain. |

LOUIS R. PRINCE, *Primary Examiner.*

ISAAC LISANN, D. M. YASICH, *Assistant Examiners.*